US 12,392,715 B2

(12) United States Patent
Ishihara et al.

(10) Patent No.: US 12,392,715 B2
(45) Date of Patent: Aug. 19, 2025

(54) ATOMIC ABSORPTION SPECTROPHOTOMETER

(71) Applicant: SHIMADZU CORPORATION, Kyoto (JP)

(72) Inventors: Hikaru Ishihara, Kyoto (JP); Hidemiki Hayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 200 days.

(21) Appl. No.: 18/006,585

(22) PCT Filed: May 18, 2021

(86) PCT No.: PCT/JP2021/018792
§ 371 (c)(1),
(2) Date: Jan. 24, 2023

(87) PCT Pub. No.: WO2022/024505
PCT Pub. Date: Feb. 3, 2022

(65) Prior Publication Data
US 2023/0324287 A1   Oct. 12, 2023

(30) Foreign Application Priority Data

Jul. 29, 2020 (JP) ................................ 2020-128261

(51) Int. Cl.
*G01N 21/31* (2006.01)
*G01N 21/01* (2006.01)

(52) U.S. Cl.
CPC ......... *G01N 21/3103* (2013.01); *G01N 21/01* (2013.01); *G01N 2021/0112* (2013.01); *G01N 2021/3111* (2013.01)

(58) Field of Classification Search
CPC ................................................ G01N 2201/024
See application file for complete search history.

(56) References Cited

U.S. PATENT DOCUMENTS 3,982,834 A * 9/1976 Tamm .................... G01N 21/74
356/244

FOREIGN PATENT DOCUMENTS

| CN | 208399371 U | * | 1/2019 | ............... E05C 3/30 |
| JP | 2000-065737 A | | 3/2000 | |
| WO | WO-2018177504 A1 | * | 10/2018 | ................ F27B 9/06 |

OTHER PUBLICATIONS

Machine translation of Sun (CN-208399371-U) (Year: 2019).*
(Continued)

*Primary Examiner* — Uzma Alam
*Assistant Examiner* — Paul Schnase
(74) *Attorney, Agent, or Firm* — Sughrue Mion, PLLC

(57) ABSTRACT

An atomic absorption spectrophotometer includes a first holder, a fixed portion, and a movable portion. In an inner circumferential surface of the fixed portion, a first female thread portion is formed from an end on a rear side toward a front side in a direction of fitting of the fixed portion to the first holder, and a small-diameter portion having an inner diameter smaller than a minimum diameter of the first female thread portion is formed while it is located on the front side in the direction of fitting with respect to the first female thread portion. In an inner circumferential surface of the movable portion, a second female thread portion having a minimum diameter larger than a maximum diameter of the first female thread portion is formed from an end on the rear side toward the front side in the direction of fitting of the movable portion.

8 Claims, 7 Drawing Sheets

(56) References Cited

OTHER PUBLICATIONS

Written Opinion of PCT/JP2021/018792 dated Aug. 3, 2021 [PCT/ISA/237].
International Search Report of PCT/JP2021/018792 dated Aug. 3, 2021 [PCT/ISA/210].

* cited by examiner

ATOMIC ABSORPTION SPECTROPHOTOMETER

CROSS REFERENCE TO RELATED APPLICATIONS

This application is a National Stage of International Application No. PCT/JP2021/018792 filed May 18, 2021, claiming priority based on Japanese Patent Application No. 2020-128261 filed Jul. 29, 2020.

TECHNICAL FIELD

The present invention relates to an atomic absorption spectrophotometer.

BACKGROUND ART

Prior documents disclosing a configuration of an atomic absorption spectrophotometer include Japanese Patent Laying-Open No. 2000-65737 (PTL 1). In the atomic absorption spectrophotometer described in PTL 1, a graphite holder pressed into a cooling block is attached and removed with the use of a cup and a handle.

CITATION LIST

Patent Literature

PTL 1: Japanese Patent Laying-Open No. 2000-65737

SUMMARY OF INVENTION

Technical Problem

When the holder pressed into the cooling block is attached or removed with the use of the cup and the handle, positions of the cup and the handle with respect to the holder are reverse between attachment of the holder and removal of the holder.

Therefore, the holder should be accessible on both sides of a direction of attachment and removal of the holder.

The present invention was made to solve the problem above, and an object of the present invention is to provide an atomic absorption spectrophotometer in which a holder can be attached and removed by access from a one direction side of a direction of attachment and removal of the holder.

Solution to Problem

In an atomic absorption spectrophotometer based on the present invention, a holder is removably fitted to a block, the holder holding a tube for heating a sample as a result of flow of a current, the holder being provided with a through hole. The atomic absorption spectrophotometer includes a fixed portion and a movable portion. The fixed portion is provided around a virtual axis that extends in a direction of fitting of the holder to the block, and fixed to the block while the fixed portion is located at a distance on a front side in the direction of fitting with respect to the holder. The movable portion is provided around the virtual axis and provided as being able to abut on the holder on the front side in the direction of fitting by moving over an outer side of the fixed portion along the virtual axis while the movable portion is located on the front side in the direction of fitting with respect to the holder. In an inner circumferential surface of the fixed portion, a first female thread portion is formed from an end on a rear side toward the front side in the direction of fitting of the fixed portion, and a small-diameter portion having an inner diameter smaller than a minimum diameter of the first female thread portion is formed while the small-diameter portion is located on the front side in the direction of fitting with respect to the first female thread portion. In an inner circumferential surface of the movable portion, a second female thread portion having a minimum diameter larger than a maximum diameter of the first female thread portion is formed from an end on the rear side toward the front side in the direction of fitting of the movable portion. While a first bolt including a first male thread portion and a shaft portion is inserted into the through hole in the direction of fitting, the first male thread portion being located on the front side in the direction of fitting, having a maximum diameter smaller than the minimum diameter of the second female thread portion, and being fitted to the first female thread portion, the shaft portion being located on the rear side in the direction of fitting of the first male thread portion and having an outer diameter smaller than the minimum diameter of the second female thread portion, the first male thread portion is fastened to the first female thread portion so that the first bolt can press the holder from the rear side toward the front side in the direction of fitting. As a second bolt including an abutment portion and a second male thread portion is inserted into the through hole in the direction of fitting and the second male thread portion is fastened to the second female thread portion with the abutment portion abutting on the small-diameter portion, the abutment portion being located on the front side in the direction of fitting, having an outer diameter smaller than the minimum diameter of the first female thread portion and larger than the inner diameter of the small-diameter portion, and being able to abutting on the small-diameter portion in the direction of fitting, the second male thread portion being located on the rear side in the direction of fitting of the abutment portion and being fitted to the second female thread portion, the movable portion that is moved toward the holder can press the holder from the front side toward the rear side in the direction of fitting.

Advantageous Effects of Invention

According to the present invention, the holder can be attached and removed by access from a one direction side of a direction of attachment and removal of the holder.

DESCRIPTION OF EMBODIMENTS

Figure 1:
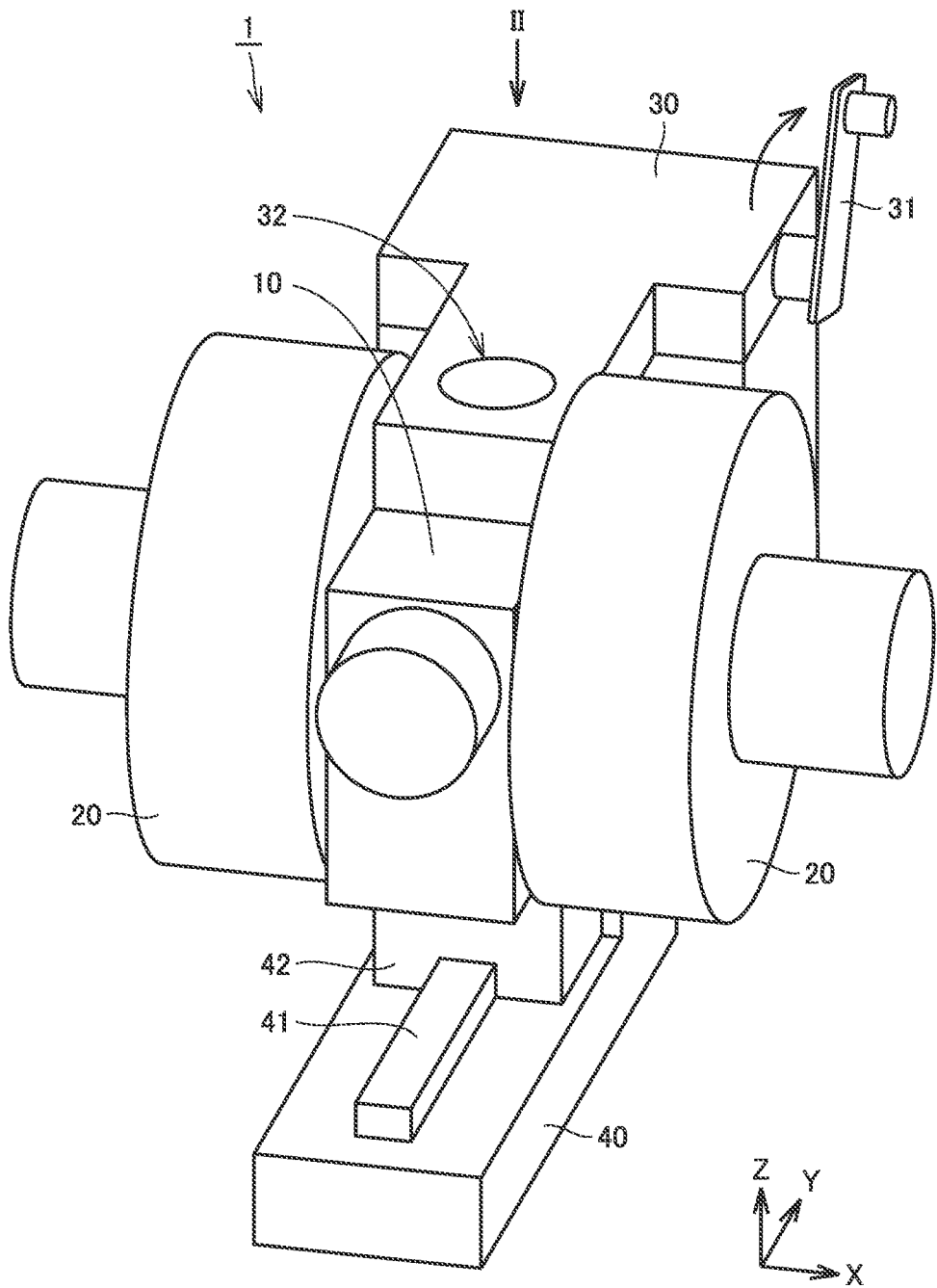
FIG. 1 is a perspective view showing an appearance of an atomic absorption spectrophotometer according to one embodiment.

An atomic absorption spectrophotometer according to one embodiment will be described below with reference to the drawings. In the description of the embodiment below, identical or corresponding elements in the drawings have identical reference characters allotted and description thereof will not be repeated. In the drawings, a direction in parallel to a direction of an optical axis of irradiation light used for atomic absorption analysis is shown as an X direction, a direction in parallel to a direction of fitting of a holder is shown as a Y direction, and a direction in parallel to a direction of injection of a sample is shown as a Z direction.

Figure 2:
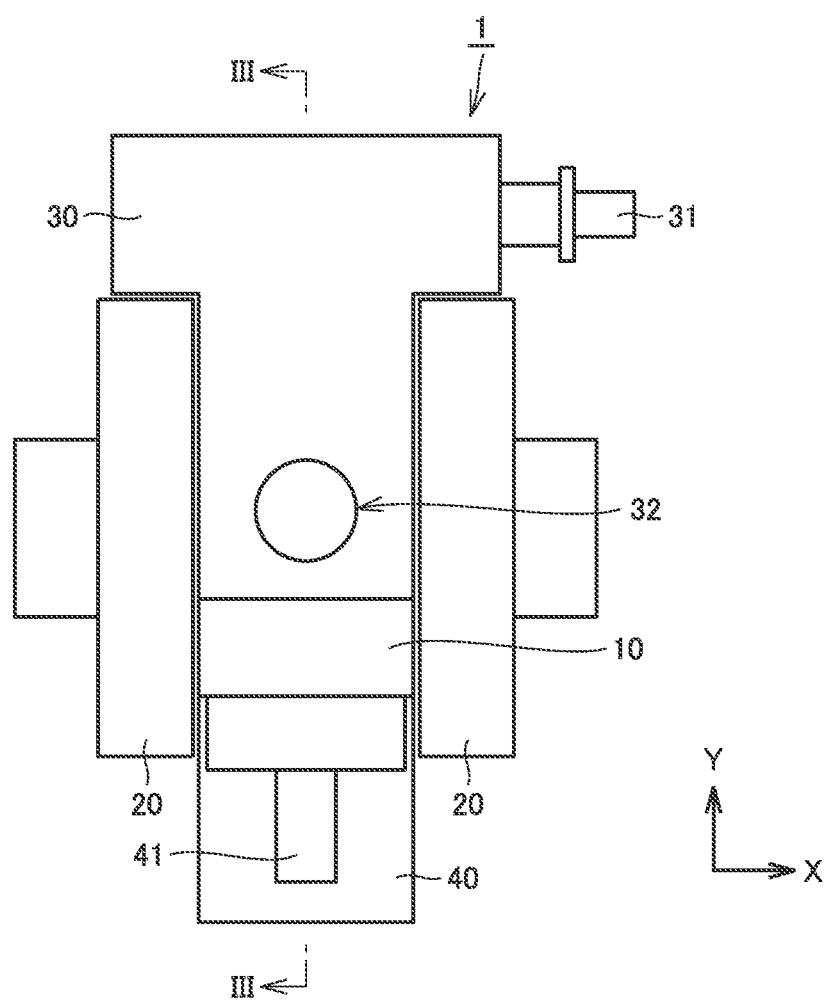
FIG. 2 is a plan view of the atomic absorption spectrophotometer in FIG. 1 in a direction shown with an arrow II.
Figure 3:
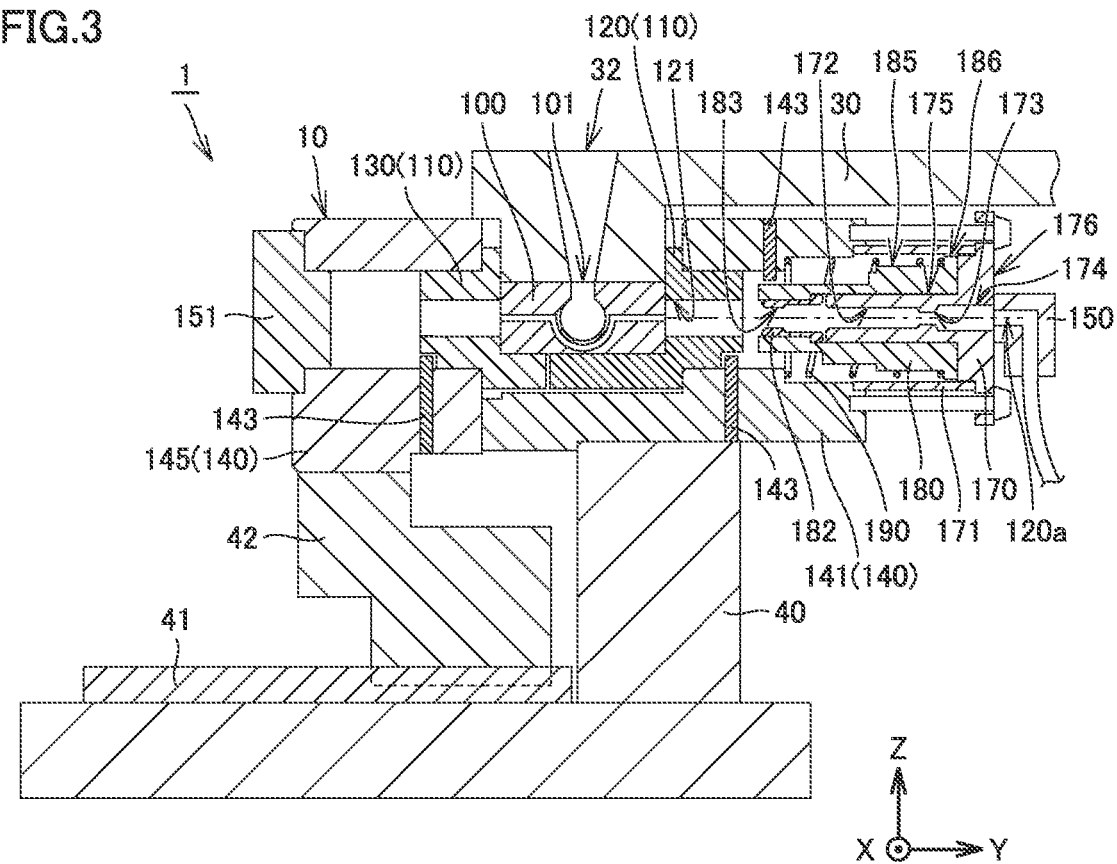
FIG. 3 is a cross-sectional view of the atomic absorption spectrophotometer in FIG. 2 in a direction shown with an arrow III-III.

FIG. 1 is a perspective view showing an appearance of an atomic absorption spectrophotometer according to one embodiment. FIG. 2 is a plan view of the atomic absorption spectrophotometer in FIG. 1 in a direction shown with an arrow II. FIG. 3 is a cross-sectional view of the atomic absorption spectrophotometer in FIG. 2 in a direction shown with an arrow III-III.

As shown in FIGS. 1 to 3, an atomic absorption spectrophotometer 1 according to one embodiment includes a sample heating portion 10. Sample heating portion 10 is a portion for atomization of a sample by electrical heating. Sample heating portion 10 includes a tube 100, a holder 110, and a block 140. Sample heating portion 10 is composed of a conductive material for electrical heating of the sample.

As shown in FIG. 3, atomic absorption spectrophotometer 1 according to the present embodiment further includes a fixed portion 170 and a movable portion 180. As shown in FIGS. 1 and 2, atomic absorption spectrophotometer 1 further includes a pair of coils 20, a pusher 30, a lever 31, a base 40, a slide mechanism 41, and a support base 42. As shown in FIG. 3, atomic absorption spectrophotometer 1 further includes a spring 190, a gas introduction portion 150, and a cap 151.

As shown in FIGS. 1 and 2, the pair of coils 20 is arranged as being opposed to each other with sample heating portion 10 lying therebetween. A direction in which the pair of coils 20 is arranged as being aligned coincides with the direction of the optical axis of irradiation light used for atomic absorption analysis.

Pusher 30 is arranged on an upper side and a rear surface side of sample heating portion 10. Pusher 30 pivots as a result of operation onto lever 31, with a rotation shaft connected to lever 31 being defined as a fulcrum. Pusher 30 presses sample heating portion 10 in the negative Z direction while lever 31 is moved in a direction shown with an arrow in FIG. 1 and erected as shown in FIG. 1. Pusher 30 is provided with a sample injection hole 32. The sample is introduced into tube 100 through sample injection hole 32. Sample injection hole 32 is opened and closed by a not-shown lid.

As shown in FIG. 3, tube 100 extends in the X direction. In the inside of tube 100, a space having an annular cross-section into which the sample is injected is provided. Tube 100 is provided with a sample injection port 101 in an upper portion in the positive Z direction. Tube 100 is provided with a flow channel through which inert gas supplied from gas introduction portion 150 can flow. The sample injected into tube 100 through sample injection port 101 is heated by heat generation by tube 100 at the time of flow of a current through tube 100. Tube 100 is formed, for example, of graphite. Tube 100 is pressed in the negative Z direction by pusher 30 during injection and analysis of the sample.

Holder 110 is constituted of a first holder 120 and a second holder 130. First holder 120 and second holder 130 are arranged as being opposed to each other in the Y direction so as to hold tube 100 therebetween. Each of first holder 120 and second holder 130 is formed, for example, of graphite.

Each of first holder 120 and second holder 130 is provided with a through hole that extends in the Y direction. In an outer circumferential portion of each of first holder 120 and second holder 130, a groove that extends in the Y direction is provided. As a positioning pin 143 is fitted to this groove, each of first holder 120 and second holder 130 is prevented from turning.

Block 140 is constituted of a first block 141 and a second block 145. Each of first block 141 and second block 145 is provided with a through hole that extends in the Y direction. First holder 120 is removably fitted to first block 141. A direction of fitting of first holder 120 to first block 141 is the positive Y direction. Second holder 130 is removably fitted to second block 145. The direction of fitting of second holder 130 to second block 145 is the negative Y direction.

As first holder 120 is fitted to first block 141, first block 141 and first holder 120 come in intimate contact with each other and conductivity between first block 141 and first holder 120 becomes higher. As second block 145 is fitted to second holder 130, second block 145 and second holder 130 come in intimate contact with each other and conductivity between second block 145 and second holder 130 becomes higher.

First block 141 is supported on base 40 from below in a Z-axis direction. As shown in FIGS. 1 to 3, slide mechanism 41 is provided on base 40. Slide mechanism 41 supports support base 42 connected to second block 145 as being movable in the Y direction. Second block 145 is thus movable in the Y direction.

As a voltage is applied across first block 141 and second block 145, a current flows through tube 100 via first holder 120 and second holder 130 so that tube 100 generates heat.

Fixed portion 170 is in a shape of a pipe with an annular pipe portion 175 and a flange portion 176 located on a front side (positive Y direction) of annular pipe portion 175 in the direction of fitting, and provided around a virtual axis 120a that extends in the direction of fitting of first holder 120 to first block 141. Fixed portion 170 is fixed to first block 141 while it is located at a distance from first holder 120 on the front side (positive Y direction) in the direction of fitting. Specifically, fixed portion 170 is fastened to first block 141 by means of a bolt with an annular sleeve 171 lying between first block 141 and flange portion 176 while annular pipe portion 175 is located in sleeve 171.

In an inner circumferential surface of fixed portion 170, a first female thread portion 172 is formed from an end on a rear side (negative Y direction) toward the front side (positive Y direction) in the direction of fitting of fixed portion 170. Furthermore, in the inner circumferential surface of fixed portion 170, a small-diameter portion 173 having an inner diameter smaller than a minimum diameter of first female thread portion 172 is formed while it is located on the front side (positive Y direction) in the direction of fitting with respect to first female thread portion 172. A gas flow-in portion 174 in which inert gas supplied from gas introduction portion 150 flows is located on the front side (positive Y direction) of small-diameter portion 173 in the direction of fitting.

Movable portion 180 is in a shape of a pipe with an annular pipe portion 185 and a flange portion 186 located on the front side (positive Y direction) of annular pipe portion 185 in the direction of fitting, and is provided around virtual axis 120a. Movable portion 180 is provided as being able to abut on first holder 120 from the front side (positive Y direction) in the direction of fitting by moving over an outer side of annular pipe portion 175 of fixed portion 170 along virtual axis 120a while movable portion 180 is located on the front side (positive on Y direction) in the direction of fitting with respect to first holder 120.

In an inner circumferential surface of movable portion 180, a second female thread portion 183 having a minimum diameter larger than a maximum diameter of first female thread portion 172 is formed from an end on the rear side (negative Y direction) toward the front side (positive Y direction) in the direction of fitting of movable portion 180. Specifically, second female thread portion 183 is provided in an inner circumferential surface of a removably fitted cylindrical female thread member 182, in the inside of the end of movable portion 180 on the rear side (negative Y direction) in the direction of fitting.

In an outer circumferential portion of movable portion 180, a groove that extends in the Y direction is provided, and as positioning pin 143 is fitted to this groove, the movable portion is prevented from turning. Movable portion 180 is movable in the Y direction along annular pipe portion 175 of fixed portion 170.

Spring 190 biases movable portion 180 toward the front side (positive Y direction) in the direction of fitting. Spring 190 lies between flange portion 186 of movable portion 180 and first block 141. With biasing force of spring 190, flange portion 186 of movable portion 180 presses flange portion 176 of fixed portion 170 from the rear side (negative Y direction) in the direction of fitting.

As shown in FIG. 3, gas introduction portion 150 is connected to first block 141 with fixed portion 170 being interposed. Second block 145 is provided with cap 151 such that the cap is opposed to gas introduction portion 150. The space in the inside of the inner circumferential surface of fixed portion 170 communicates with tube 100 through the space in the inside of the inner circumferential surface of movable portion 180 and a through hole 121 in first holder 120. As inert gas supplied from gas introduction portion 150 passes through tube 100, increase in temperature and oxidation of tube 100 during analysis of the sample are suppressed. For example, argon gas is adopted as inert gas.

In atomic absorption spectrophotometer 1 according to the present embodiment, a sample is sent from sample injection hole 32 in pusher 30 through sample injection port 101 into tube 100, heated and atomized by heat generation by tube 100, and subjected to atomic absorption analysis based on light that is emitted in the X direction and passes through tube 100.

The pair of coils 20 arranged on opposing sides in the axial direction of tube 100 that intersects with the direction of fitting of first block 141 to first holder 120 is fed with power through a not-shown electrical wire, so as to be able to apply magnetic field to tube 100 located between them. As magnetic field is applied to tube 100 and an analytical value of the sample is subjected to background correction, accuracy in analysis can be improved. For example, a background-correction system using Zeeman splitted spectrum is adopted as the correction method.

A method of replacing each of tube 100 and holder 110 in atomic absorption spectrophotometer 1 according to the present embodiment will be described below. In replacement of each of tube 100 and holder 110, initially, pusher 30 is retracted and second block 145 is moved toward the negative Y direction to move second block 145 away from first block 141 with the use of slide mechanism 41.

Figure 4:
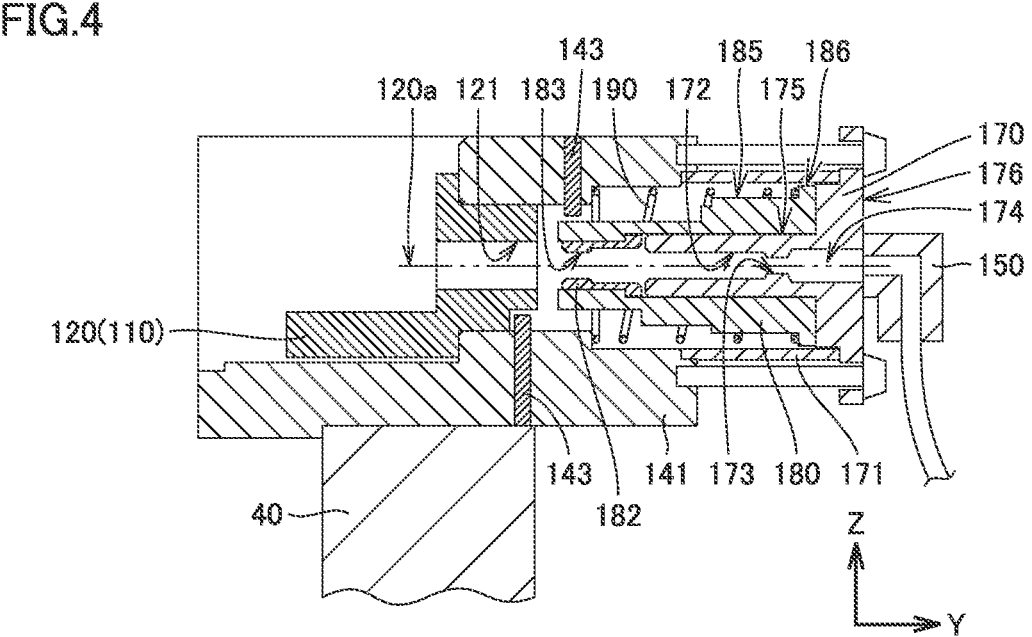
FIG. 4 is a partial cross-sectional view of the atomic absorption spectrophotometer according to one embodiment in which a second block has been located away from a first block.

FIG. 4 is a partial cross-sectional view of the atomic absorption spectrophotometer according to one embodiment in which the second block has been located away from the first block. As shown in FIG. 4, by moving second block 145 away from first block 141, tube 100 can be removed. Furthermore, by removing cap 151 from second block 145, access can be made from both sides in the direction of attachment and removal of second holder 130, so that second holder 130 can be attached to and removed from second block 145 with a conventional method. To first holder 120, on the other hand, access can be made only from the rear side (negative Y direction) in the direction of fitting which is the one direction side of the direction of attachment and removal of first holder 120.

In atomic absorption spectrophotometer 1 according to the present embodiment, replacement of first holder 120 is restricted by arrangement of the pair of coils 20 and pusher 30. Therefore, a dedicated tool attachable and removable by access in one direction should be used in attachment and removal of first holder 120.

The dedicated tool used in attachment and removal of first holder 120 according to the present embodiment to and from first block 141 will be described below.

Figure 5:
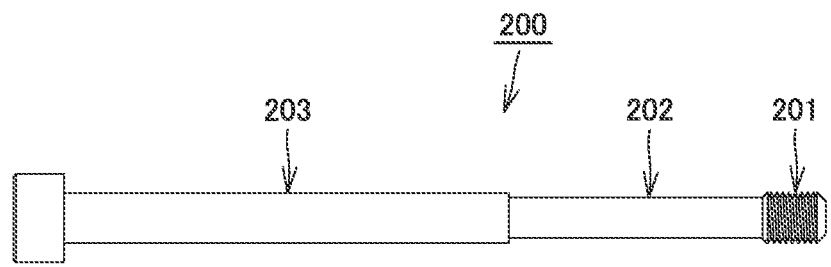
FIG. 5 is a plan view showing a construction of a first bolt used in attachment of a first holder to the first block in the atomic absorption spectrophotometer according to one embodiment.

FIG. 5 is a plan view showing a construction of a first bolt used in attachment of the first holder to the first block in the atomic absorption spectrophotometer according to one embodiment. As shown in FIG. 5, a first bolt 200 includes a first male thread portion 201, a first shaft portion 202, and a second shaft portion 203.

First male thread portion 201 is located at a tip end on the front side (positive Y direction) of first bolt 200 in the direction of fitting. First male thread portion 201 has a maximum diameter smaller than a minimum diameter of second female thread portion 183.

First shaft portion 202 is connected to first male thread portion 201. First shaft portion 202 is located on the rear side (negative Y direction) of first male thread portion 201 in the direction of fitting. First shaft portion 202 has an outer diameter smaller than the minimum diameter of second female thread portion 183.

Second shaft portion 203 is connected on a side of first shaft portion 202 opposite to first male thread portion 201. Second shaft portion 203 has an outer diameter smaller than through hole 121 in first holder 120.

Figure 6:
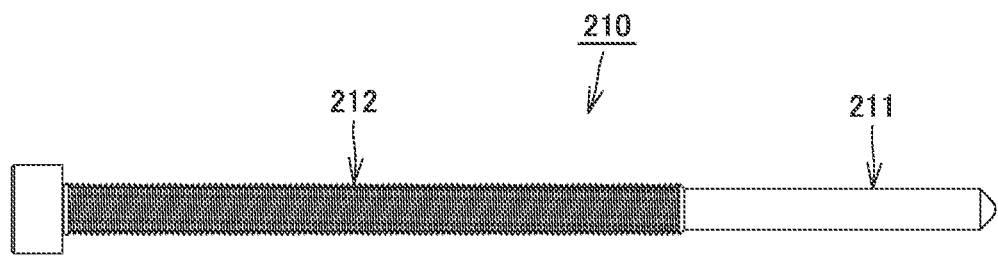
FIG. 6 is a plan view showing a construction of a second bolt used in detachment of the first holder from the first block according to one embodiment.

FIG. 6 is a plan view showing a construction of a second bolt used in detachment of the first holder according to one embodiment from the first block. As shown in FIG. 6, a second bolt 210 includes an abutment portion 211 and a second male thread portion 212.

Abutment portion 211 is located at a tip end on the front side (positive Y direction) of second bolt 210 in the direction of fitting. Abutment portion 211 has an outer diameter smaller than the minimum diameter of first female thread portion 172 and larger than the inner diameter of small-diameter portion 173.

Second male thread portion 212 is connected to abutment portion 211. Second male thread portion 212 is located on the rear side (negative Y direction) of abutment portion 211 in the direction of fitting. Second male thread portion 212 has a maximum diameter that allows fitting to second female thread portion 183.

Operations in attachment of first holder 120 to first block 141 in atomic absorption spectrophotometer 1 according to the present embodiment will be described below.

Figure 7:
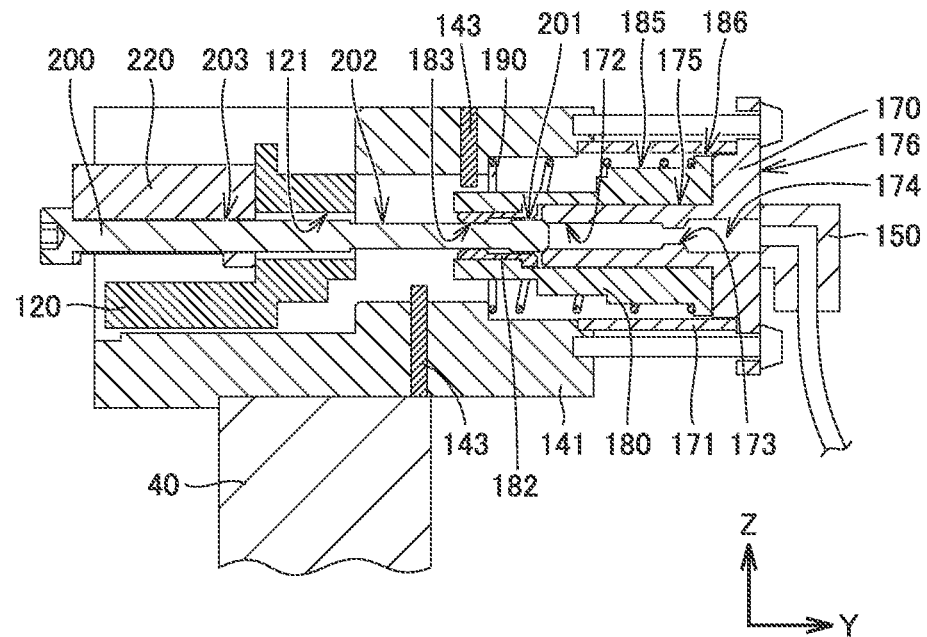
FIG. 7 is a cross-sectional view showing a state before attachment to the first block, of the first holder provided in the atomic absorption spectrophotometer according to one embodiment.
Figure 8:
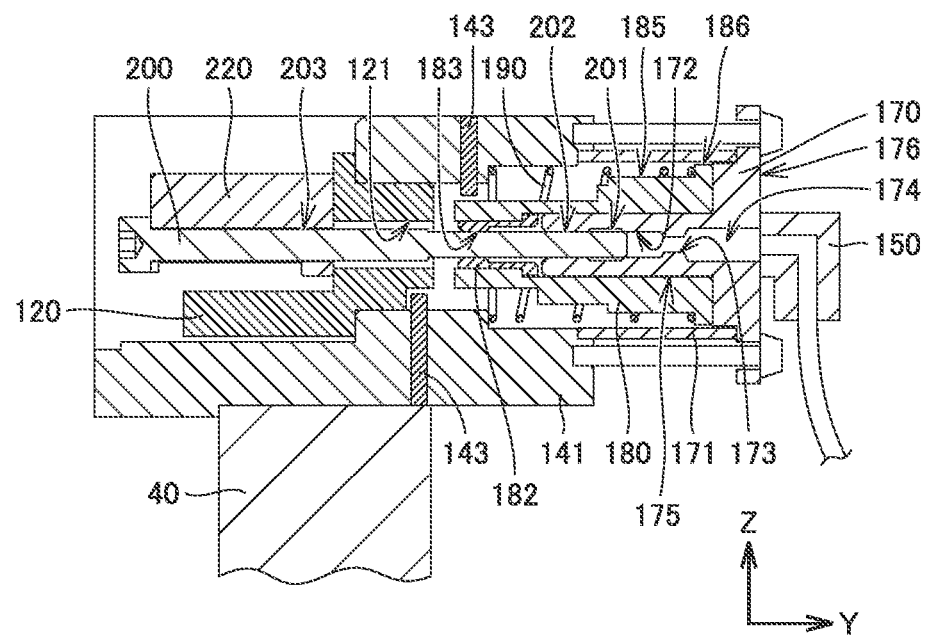
FIG. 8 is a cross-sectional view showing a state after attachment to the first block, of the first holder provided in the atomic absorption spectrophotometer according to one embodiment.

FIG. 7 is a cross-sectional view showing a state before attachment to the first block, of the first holder provided in the atomic absorption spectrophotometer according to one embodiment. FIG. 8 is a cross-sectional view showing a state after attachment to the first block, of the first holder provided in the atomic absorption spectrophotometer according to one embodiment. For the sake of facilitated understanding, FIGS. 7 and 8 do not show a thread profile of first male thread portion 201.

As shown in FIG. 7, in attachment of first holder 120 to first block 141, a jig block 220 may be used. Jig block 220 performs a function to increase an area where axial force generated by fastening of first bolt 200 is applied, to thereby mitigate concentration of stress. Jig block 220 is provided with a hole through which first bolt 200 can be inserted. First bolt 200 is inserted into the hole in jig block 220 and inserted into through hole 121 in first holder 120 in the direction of fitting. Consequently, jig block 220 lies between a head of first bolt 200 and first holder 120.

Since first male thread portion 201 has the maximum diameter smaller than the minimum diameter of second female thread portion 183, it can be inserted in the inside of the inner circumferential surface of movable portion 180. Since first shaft portion 202 has the outer diameter smaller than the minimum diameter of second female thread portion 183, it can be inserted in the inside of the inner circumferential surface of movable portion 180. First male thread portion 201 is fitted to first female thread portion 172 while first male thread portion 201 and a part of first shaft portion 202 are located in the inside of movable portion 180.

As shown in FIG. 8, while first bolt 200 is inserted in through hole 121 in first holder 120 in the direction of fitting, first male thread portion 201 is fastened to first female thread portion 172, so that first bolt 200 can press first holder 120 from the rear side (negative Y direction) toward the front side (positive Y direction) in the direction of fitting with jig block 220 being interposed.

Specifically, since fixed portion 170 is fixed to first block 141 at the time of fastening of first male thread portion 201 to first female thread portion 172, axial force generated in first bolt 200 presses first holder 120 toward the front side (positive Y direction) in the direction of fitting with jig block 220 being interposed, so that first holder 120 is fitted to first block 141.

Operations in detachment of first holder 120 from first block 141 in atomic absorption spectrophotometer 1 according to the present embodiment will be described below.

Figure 9:
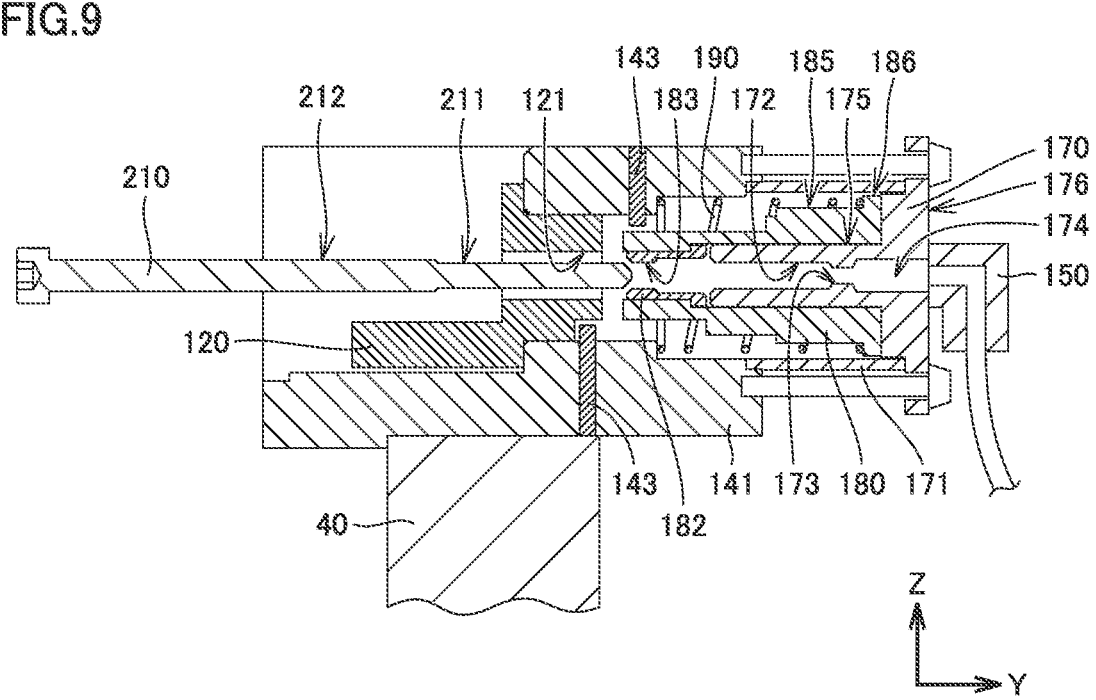
FIG. 9 is a cross-sectional view showing a state before the second bolt is inserted in a movable portion provided in the atomic absorption spectrophotometer according to one embodiment.
Figure 10:
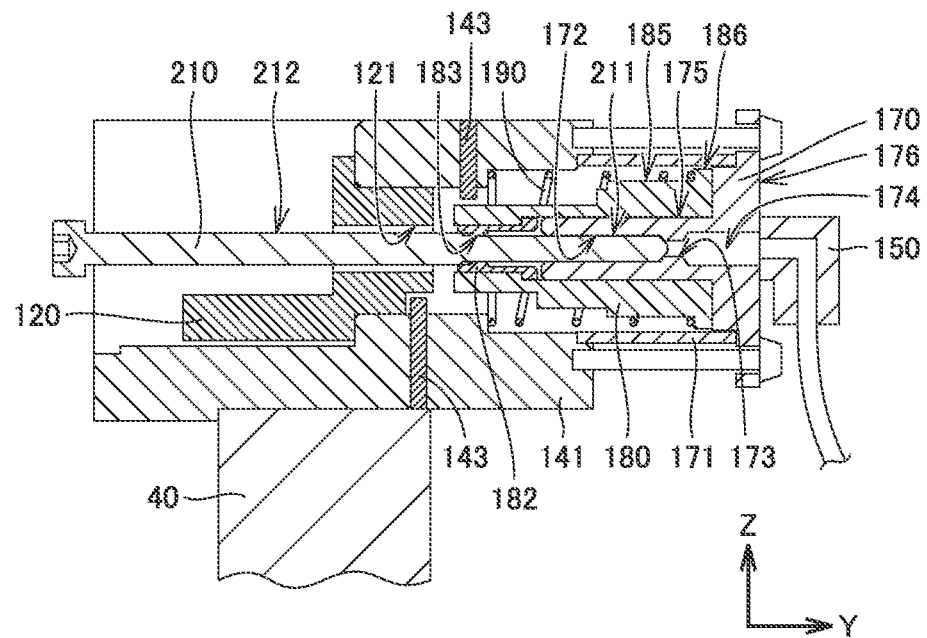
FIG. 10 is a cross-sectional view showing a state in which an abutment portion of the second bolt abuts on a small-diameter portion of a fixed portion provided in the atomic absorption spectrophotometer according to one embodiment.
Figure 11:
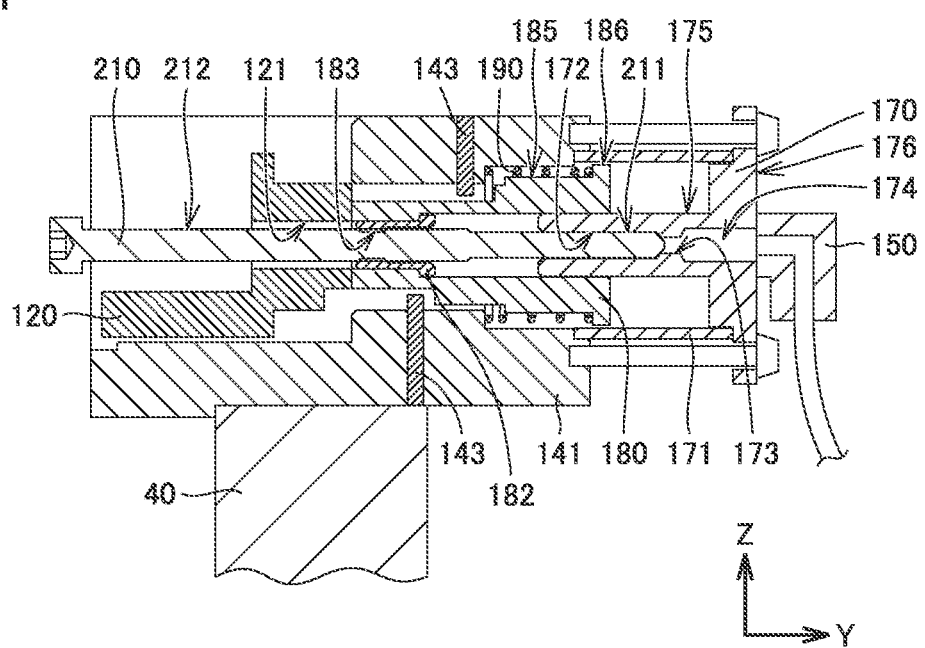
FIG. 11 is a cross-sectional view showing a state in which the first holder provided in the atomic absorption spectrophotometer according to one embodiment is detached from the first block.

FIG. 9 is a cross-sectional view showing a state before the second bolt is inserted in the movable portion provided in the atomic absorption spectrophotometer according to one embodiment. FIG. 10 is a cross-sectional view showing a state in which the abutment portion of the second bolt abuts on the small-diameter portion of the fixed portion provided in the atomic absorption spectrophotometer according to one embodiment. FIG. 11 is a cross-sectional view showing a state in which the first holder provided in the atomic absorption spectrophotometer according to one embodiment is detached from the first block. For the sake of facilitated understanding, FIGS. 9 to 11 do not show a thread profile of second male thread portion 212.

As shown in FIGS. 9 and 10, in detachment of first block 141 from first holder 120, second bolt 210 is inserted in through hole 121 in first holder 120 in the direction of fitting. Since abutment portion 211 has the outer diameter smaller than the minimum diameter of second female thread portion 183, it can be inserted in the space in the inside of the inner circumferential surface of the movable portion. Since abutment portion 211 has the outer diameter smaller than the minimum diameter of first female thread portion 172 and larger than the inner diameter of small-diameter portion 173, it can be inserted to the inner side of first female thread portion 172 and can abut on small-diameter portion 173 in the direction of fitting. While abutment portion 211 and small-diameter portion 173 abut on each other, second male thread portion 212 is fitted to second female thread portion 183.

As shown in FIG. 11, as second male thread portion 212 is fastened to second female thread portion 183 while abutment portion 211 abuts on small-diameter portion 173, second bolt 210 can press first holder 120 from the front side (positive direction) toward the rear side (negative Y direction) in the direction of fitting by means of movable portion 180 that is moved toward first holder 120.

As second male thread portion 212 is fastened to second female thread portion 183 with abutment portion 211 abutting on small-diameter portion 173, movable portion 180 is moved from the front side (positive Y direction) toward the rear side (negative Y direction) in the direction of fitting against biasing force of spring 190. As first holder 120 is pressed by movable portion 180, first holder 120 is detached from first block 141.

After first holder 120 is detached from first block 141, fitting between second male thread portion 212 and second female thread portion 183 is cancelled, so that movable portion 180 is moved by biasing force of spring 190 until flange portion 186 abuts on flange portion 176 of fixed portion 170. Movable portion 180 is thus distant from first holder 120 and not in contact therewith during analysis of the sample.

In atomic absorption spectrophotometer 1 according to one embodiment of the present invention, first holder 120 is pressed toward the front side in the direction of fitting by fastening of first bolt 200 to fixed portion 170 and pressed toward the rear side in the direction of fitting as second bolt 210 is fastened to movable portion 180 with abutment portion 211 abutting on small-diameter portion 173. First holder 120 can thus be attached to and removed from first block 141 by access in one direction in the direction of attachment and removal of first holder 120. Furthermore, as first holder 120 can be attached and removed by access in one direction, a space necessary for works for attachment and removal of first holder 120 can be made smaller and hence an apparatus can be space-saving. As fixed portion 170 and movable portion 180 are attached to first block 141, attachment and removal works can be easier and time for attachment and removal works can be shorter.

In atomic absorption spectrophotometer 1 according to one embodiment of the present invention, first holder 120 can be attached to and removed from first block 141 by access from the one direction side in the direction of attachment and removal of first holder 120. Therefore, in an example where a mechanism adapted to the background-correction system using Zeeman splitted spectrum is adopted, first holder 120 can be attached and removed through between the pair of coils 20.

In atomic absorption spectrophotometer 1 according to one embodiment of the present invention, as spring 190 biases movable portion 180 toward the front side in the direction of fitting of first holder 120, a state in which first holder 120 and movable portion 180 are not in contact with each other during analysis of the sample can be maintained. Conduction of heat of first holder 120 to movable portion 180 during analysis of the sample can thus be suppressed.

In atomic absorption spectrophotometer 1 according to one embodiment of the present invention, the space in the inside of the inner circumferential surface of fixed portion 170 communicates with tube 100 through the space in the inside of the inner circumferential surface of movable portion 180 and through hole 121 in first holder 120. Inert gas can thus directly be injected from gas introduction portion 150 to tube 100. Consequently, tube 100 can effectively be cooled and oxidation thereof can be suppressed.

[Aspects]

An illustrative embodiment described above is understood by a person skilled in the art as specific examples of aspects below.

(Clause 1)

In an atomic absorption spectrophotometer according to one aspect, a holder is removably fitted to a block, the holder holding a tube for heating a sample as a result of flow of a current, the holder being provided with a through hole, the atomic absorption spectrophotometer includes a fixed portion provided around a virtual axis that extends in a direction of fitting of the holder to the block, the fixed portion being fixed to the block while the fixed portion is located at a distance on a front side in the direction of fitting with respect to the holder, and a movable portion provided around the virtual axis, the movable portion being provided as being able to abut on the holder on the front side in the direction of fitting by moving over an outer side of the fixed portion along the virtual axis while the movable portion is located on the front side in the direction of fitting with respect to the holder, in an inner circumferential surface of the fixed portion, a first female thread portion is formed from an end on a rear side toward the front side in the direction of fitting of the fixed portion, and a small-diameter portion having an inner diameter smaller than a minimum diameter of the first female thread portion is formed while the small-diameter portion is located on the front side in the direction of fitting with respect to the first female thread portion, in an inner circumferential surface of the movable portion, a second female thread portion having a minimum diameter larger than a maximum diameter of the first female thread portion is formed from an end on the rear side toward the front side in the direction of fitting of the movable portion, while a first bolt including a first male thread portion and a shaft portion is inserted into the through hole in the direction of fitting, the first male thread portion being located on the front side in the direction of fitting, having a maximum diameter smaller than the minimum diameter of the second female thread portion, and being fitted to the first female thread portion, the shaft portion being located on the rear side in the direction of fitting of the first male thread portion and having an outer diameter smaller than the minimum diameter of the second female thread portion, the first male thread portion is fastened to the first female thread portion so that the first bolt can press the holder from the rear side toward the front side in the direction of fitting, and as a second bolt including an abutment portion and a second male thread portion is inserted into the through hole in the direction of fitting and the second male thread portion is fastened to the second female thread portion with the abutment portion abutting on the small-diameter portion, the abutment portion being located on the front side in the direction of fitting, having an outer diameter smaller than the minimum diameter of the first female thread portion and larger than the inner diameter of the small-diameter portion, and being able to abutting on the small-diameter portion in the direction of fitting, the second male thread portion being located on the rear side in the direction of fitting of the abutment portion and being fitted to the second female thread portion, the movable portion that is moved toward the holder can press the holder from the front side toward the rear side in the direction of fitting.

According to the atomic absorption spectrophotometer described in Clause 1, the holder can be attached and removed by access from a one direction side of a direction of attachment and removal of the holder.

(Clause 2)

The atomic absorption spectrophotometer described in Clause 1 further includes a pair of coils arranged on opposing sides in an axial direction of the tube that intersects with the direction of fitting, and the pair of coils can apply magnetic field to the tube located between the pair of coils.

According to the atomic absorption spectrophotometer described in Clause 2, in an example where a background-correction system using Zeeman splitted spectrum is adopted, the holder can be attached and removed by access from the one direction side of the direction of attachment and removal through between the pair of coils.

(Clause 3)

The atomic absorption spectrophotometer described in Clause 1 or 2 further includes a spring that biases the movable portion in the direction of fitting, and the movable portion is moved from the front side toward the rear side in the direction of fitting against biasing force of the spring as the second male thread portion is fastened to the second female thread portion with the abutment portion abutting on the small-diameter portion.

According to the atomic absorption spectrophotometer described in Clause 3, since the first holder and the movable portion are prevented from coming in contact with each other during analysis of the sample, diffusion of heat generation in the first holder to the movable portion can be suppressed.
(Clause 4)

In the atomic absorption spectrophotometer described in any one of Clauses 1 to 3, a space in the inside of the inner circumferential surface of the fixed portion communicates with the tube through a space in the inside of the inner circumferential surface of the movable portion and the through hole in the holder.

According to the atomic absorption spectrophotometer described in Clause 4, performance to prevent oxidation of the tube can be maintained by direct injection of inert gas into the tube through the inside of the fixed portion and the movable portion.

The embodiment disclosed herein is illustrative in every respect and is not to be regarded as the basis of limitative construction. Therefore, the technical scope of the present disclosure is not constructed only based on the embodiment above. Any modifications within the scope and meaning equivalent to the terms of the claims are included. Features that can be combined may be combined with one another in the description of the embodiment above.

REFERENCE SIGNS LIST 1 atomic absorption spectrophotometer; 10 sample heating portion; 20 coil; 30 pusher; 31 lever; 32 sample injection hole; 40 base; 41 slide mechanism; 42 support base; 100 tube; 101 sample injection port; 110 holder; 120 first holder; 120a virtual axis; 121 through hole; 130 second holder; 140 block; 141 first block; 143 positioning pin; 145 second block; 150 gas introduction portion; 151 cap; 170 fixed portion; 171 sleeve; 172 first female thread portion; 173 small-diameter portion; 174 gas flow-in portion; 175, 185 annular pipe portion; 176, 186 flange portion; 180 movable portion; 182 female thread member; 183 second female thread portion; 190 spring; 200 first bolt; 201 first male thread portion; 202 first shaft portion; 203 second shaft portion; 210 second bolt; 211 abutment portion; 212 second male thread portion; 220 jig block

The invention claimed is:
1. An atomic absorption spectrophotometer in which a holder is removably fitted to a block, the holder holding a tube for heating a sample as a result of flow of a current, the holder being provided with a through hole, the atomic absorption spectrophotometer comprising:
a fixed portion provided around a virtual axis that extends in a direction of fitting of the holder to the block, a front side being a front with respect to the direction of fitting of the holder to the block and a rear side being rear with respect to the direction of fitting of the holder to the block, the fixed portion being fixed to the block while the fixed portion is located at a distance on the front side of the holder;
a movable portion provided around the virtual axis, the movable portion configured to abut on the front side of the holder by moving over an outer side of the fixed portion along the virtual axis while the movable portion is located on the front side of the holder;
a first female thread portion formed in an inner circumferential surface of the fixed portion from the rear side toward the front side;
a small-diameter portion having an inner diameter smaller than a minimum diameter of the first female thread portion formed on the front side of the inner circumferential surface of the fixed portion with respect to the first female thread portion;
a second female thread portion having a minimum diameter larger than a maximum diameter of the first female thread portion is formed on an inner circumferential surface of the movable portion from an end on the rear side toward the front side,
wherein the through hole is configured to receive a first bolt inserted into the through hole in the direction of fitting of the holder to the block in a first state and to receive a second bolt inserted into the through hole in the direction of fitting of the holder to the block in a second state;
the first bolt including a first male thread portion and a shaft portion,
the first male thread portion being located on the front side of the first bolt, the first male thread portion having a maximum diameter smaller than the minimum diameter of the second female thread portion, and configured to be fitted to the first female thread portion,
the shaft portion being located on the rear side of the first bolt and having an outer diameter smaller than the minimum diameter of the second female thread portion,
wherein, in the first state, the first male thread portion is fastened to the first female thread portion so that the first bolt presses the holder from the rear side of holder toward the front side of the holder; and
the second bolt including an abutment portion and a second male thread portion,
the second male thread portion configured to be fastened to the second female thread portion with the abutment portion abutting on the small-diameter portion in the second state,
the abutment portion being located on the front side of the second bolt and having an outer diameter smaller than the minimum diameter of the first female thread portion and larger than the inner diameter of the small-diameter portion, and being able to abut on the small-diameter portion of the inner circumferential surface of the fixed portion,
the second male thread portion being located on the rear side the abutment portion and being fitted to the second female thread portion of the inner circumferential surface of the movable portion,
wherein, in the second state, the movable portion is moved toward the holder to press the holder from the front side toward the rear side.
2. The atomic absorption spectrophotometer according to claim 1, further comprising a pair of coils arranged on opposing sides in an axial direction of the tube that intersects with the direction of fitting, wherein
the pair of coils configured to apply a magnetic field to the tube located between the pair of coils.
3. The atomic absorption spectrophotometer according to claim 1, further comprising a spring that biases the movable portion in the direction of fitting of the holder to the block, wherein
the movable portion is moved from the front side toward the rear side against a biasing force of the spring as the second male thread portion is fastened to the second female thread portion with the abutment portion abutting on the small-diameter portion.
4. The atomic absorption spectrophotometer according to claim 1, wherein a space on an inside of the inner circumferential surface of the fixed portion communicates with the tube through a space in inside of the inner circumferential surface of the movable portion and the through hole in the holder.

5. The atomic absorption spectrophotometer according to claim 2, further comprising a spring that biases the movable portion in the direction of fitting of the holder to the block, wherein the movable portion is moved from the front side toward the rear side against a biasing force of the spring as the second male thread portion is fastened to the second female thread portion with the abutment portion abutting on the small-diameter portion.

6. The atomic absorption spectrophotometer according to claim 2, wherein a space on an inside of the inner circumferential surface of the fixed portion communicates with the tube through a space in inside of the inner circumferential surface of the movable portion and the through hole in the holder.

7. The atomic absorption spectrophotometer according to claim 3, wherein a space on an inside of the inner circumferential surface of the fixed portion communicates with the tube through a space in inside of the inner circumferential surface of the movable portion and the through hole in the holder.

8. The atomic absorption spectrophotometer according to claim 5, wherein a space on an inside of the inner circumferential surface of the fixed portion communicates with the tube through a space in inside of the inner circumferential surface of the movable portion and the through hole in the holder.

\* \* \* \* \*